Figure 1:
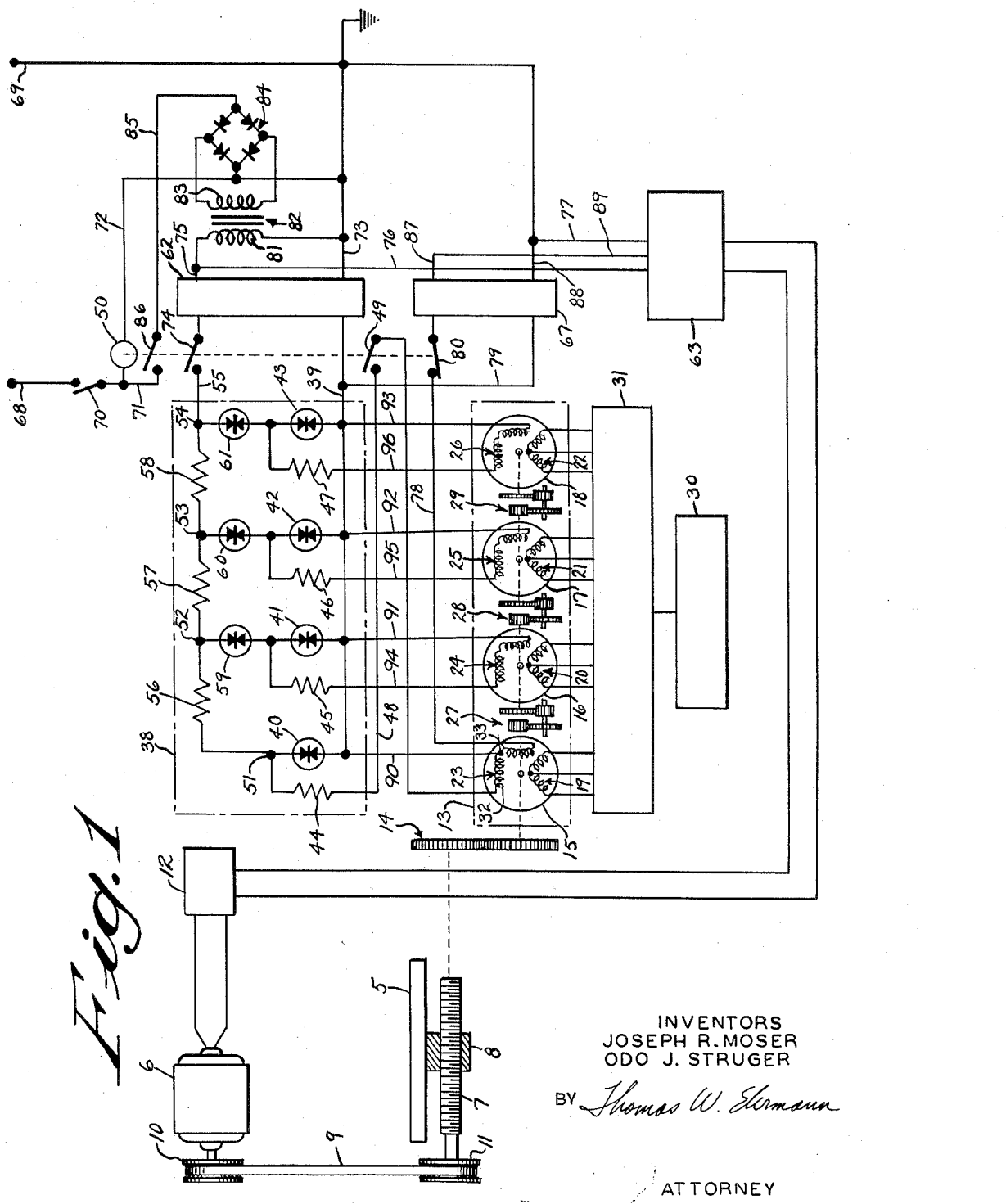

Dec. 17, 1963   J. R. MOSER ETAL   3,114,870
BACKLASH TAKE-UP SYSTEM
Filed March 9, 1962                               2 Sheets-Sheet 2

ANGULAR DISPLACEMENT OF 1000 SPEED SYNCHRO FROM CORRESPONDENCE

ANGULAR DISPLACEMENT
OF ROTOR MEMBER

INVENTORS
JOSEPH R. MOSER
ODO J. STRUGER

BY Thomas W. Ehrmann

ATTORNEY

United States Patent Office 3,114,870
Patented Dec. 17, 1963

3,114,870
BACKLASH TAKE-UP SYSTEM
Joseph R. Moser, Brookfield, and Odo J. Struger, Milwaukee, Wis., assignors to Allen-Bradley Company, Milwaukee, Wis., a corporation of Wisconsin
Filed Mar. 9, 1962, Ser. No. 178,742
6 Claims. (Cl. 318—28)

This invention relates to a backlash take-up system for a servomechanism, and particularly resides in a backlash take-up system for a feedback control system adapted to position an object and which utilizes position error detectors responsive to movement of the object to control the positioning of the object, said backlash take-up system being adapted to insure that the approach of the object to a programmed position takes place from one direction only.

Feedback control systems such as those adapted to position elements of a machine tool generally include a drive for a lead screw which, when rotated, moves the machine tool table to a desired position. Control of the drive for the lead screw is normally accomplished by a plurality of position error detectors which may be either of a direct current type, such as a potentiometer, or more commonly of an alternating current type, such as linear or rotary induction devices which are generally termed synchros. A common form of a feedback control system employs a plurality of rotary synchros each including primary and secondary windings wound about rotor and stator members. The rotor members of the rotary synchros may be mechanically coupled to the lead screw and are in turn mechanically coupled to each other by suitable gearing so that the angular displacement of the rotor member with respect to the stator member of each synchro is in a fixed relation to the linear movement of the table.

Information concerning a desired position for the machine tool work table is introduced to a command unit which produces signals corresponding to such desired position, and such signals are fed to input signal means, such as a digital to analog converter, which produces voltages that are impressed on the windings of one of the stator or rotor members of each rotary synchro. Thereafter, angular displacement of the rotor members, controlled by the position of the work table, gives rise to error voltages which are employed to control the degree and direction of movement of the lead screw by the drive. When the error voltage is zero, the object has been brought to its preselected desired position.

A plurality of rotary synchros, each having its respective zone of control, are used successively as the object travels toward the desired position to obtain greater accuracy and precision in positioning of the work table. Means are provided to transfer the control of the driving means of the lead screw from relatively coarse control rotary synchros to finer control rotary synchros as the positional disagreement decreases. It is obvious that machine tool control systems of this type are called upon to approach a desired preselected position from both sides. That is, the desired position may be either to the right or to the left of a present position. However, the lead screw which operates in a nut secured to the machine tool table has, of necessity, a certain amount of clearance between its threads and the threads on the nut, and a substantial error is introduced into the accuracy of machine tool control systems of this type because of the mechanical backlash of the lead screw and other necessary gearing. Not only will a slight degree of backlash cause inaccuracies in the positioning, but it may also render the system unstable.

The backlash take-up system of this invention eliminates the inaccuracies attendant with the presence of backlash by insuring that final positioning of the machine tool table will always be accomplished from one direction only. This may be accomplished by utilizing a synchro which has a dual element secondary winding as the final positioning control, the dual elements of the secondary winding being spaced apart. The secondary windings of the remaining synchros of coarser positioning plus one element of the secondary winding of the final positioning synchro are geared together with the lead screw to produce zero output voltage at a point which is a preselected distance offset from the final programmed position. The coarser positioning synchros and the one element of the secondary winding of the final positioning synchro, therefore, position the work table at an offset point which is always to the same side of the final desired position. Once the offset point has been reached, a second element of the secondary winding of the final positioning synchro is placed in control of the drive for the lead screw and such second element will produce an error voltage signal which will cause the drive to move the machine tool table to the final desired position. In this manner, final positioning is always accomplished from the same side and, therefore, the same side of the lead screw threads is employed. This has the effect of preventing the backlash from entering into the system since the approach is always made against one side of the lead screw.

It is, therefore, a principal object of this invention to provide a backlash take-up system which eliminates inaccuracies attendant with the presence of mechanical backlash.

It is also an object of this invention to provide a backlash take-up system for a position control system for an object which causes final positioning of the object to be accomplished from one side only.

The foregoing and other objects of this invention will appear in the description to follow. In the description, reference is made to the accompanying drawings which form a part hereof and in which there is shown by way of illustration a specific form in which this invention may be practiced. This form will be described in detail to enable those skilled in the art to practice this invention but it is to be understood that other embodiments of this invention may be used and that structural changes in the embodiment described may be made by those skilled in the art without departing from the true scope of the present invention. Consequently, the following detailed description is not to be taken in a limiting sense and the scope of the present invention is best defined by the appended claims.

Figure 2:
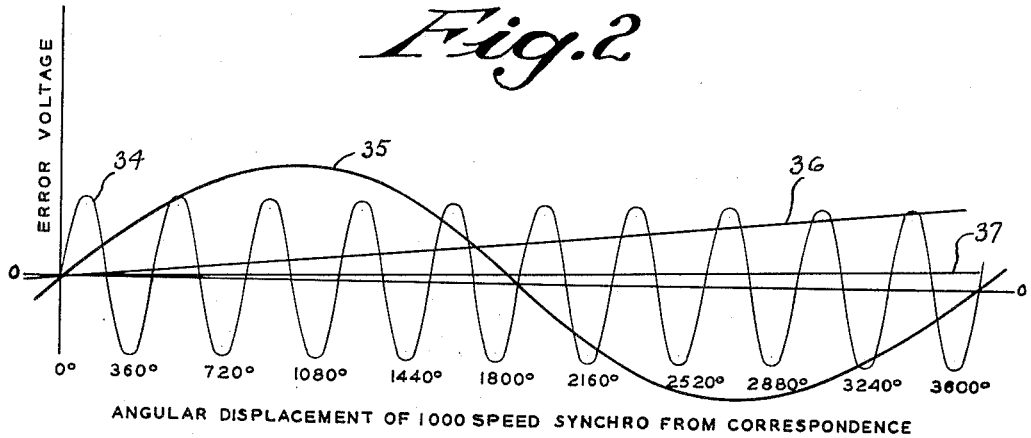
Figure 3:
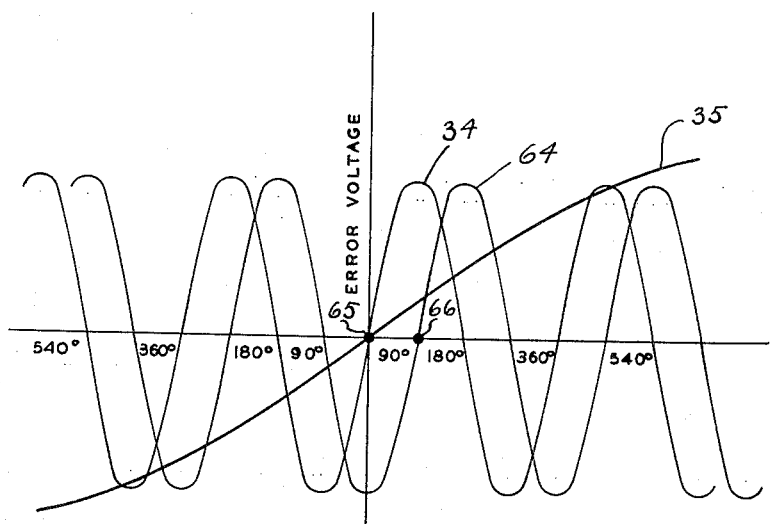

In the drawings:

FIG. 1 is a schematic diagram of a control system embodying the invention,

FIG. 2 is a chart of the loci of the peaks of the voltage output of the synchros employed in the system of FIG. 1 with respect to position plotted, positive when in phase with the source or supply voltage and negative when 180° out of phase with the source or supply voltage, and FIG. 3 is an enlarged portion of the chart of FIG. 2 and illustrating the operation of the backlash take-up system of this invention.

The backlash take-up system of this invention is adapted for use in a feedback control system which may be provided with positioning mechanism which includes meshing screw or gear teeth, and has particular adaptability to a machine tool control system which utilizes feedback to establish a preselected programmed position for a work piece. Referring to FIG. 1, there is shown therein in schematic form a machine tool control system with which the invention may be employed, and it is to be understood that the use of the backlash take-up system is not limited to use in the machine tool control system illustrated and hereinafter described.

In FIG. 1, the control system is adapted to accurately and precisely position a work table 5 of a machine tool. Positioning of the table 5 is accomplished by a drive which includes a D.C. shunt type motor 6 mechanically connected to a lead screw 7 which operates in a nut 8 securely affixed to the table 5. The lead screw 7 is rotatably supported by the base of the machine tool so that it is stationary relative to the table 5, and will affect movement of the table 5 as it is rotated by the motor 6. The mechanical connection between the motor 6 and the lead screw 7 may take the form of a belt 9 which is driven by a pulley 10 on the output shaft of the motor 6 and which drives a pulley 11 secured to the lead screw 7. The direction of drive of the motor 6, and consequently the direction of linear movement imparted to the table 5 by the lead screw 7, is controlled by a motor control circuit of conventional design and illustrated schematically in FIG. 1 as a motor control unit 12.

An error detector 13 is mechanically coupled to the lead screw 7 by suitable gearing 14. The error detector 13 includes a plurality of rotary induction devices or rotary synchros in the form of resolvers 15, 16, 17 and 18. A resolver is a form of rotary synchro having dual element primary and secondary windings and in which the dual elements are spaced 90° apart. Thus, each resolver 15, 16, 17 and 18 has a two element primary or input winding 19, 20, 21 and 22, respectively, with the elements being spaced 90° apart, and each resolver also has a two element secondary or output winding 23, 24, 25 and 26, respectively, with the elements also 90° apart. Either winding of each resolver may be mounted on a stator member and the other on a rotor member. It will be assumed, however, that the secondary windings 23, 24, 25 and 26 are mounted on the rotor members of the resolvers 15, 16, 17 and 18, respectively.

The rotor member of the resolver 15 is mechanically connected to the lead screw 7 through the gearing 14 whereby the angular displacement of the rotor member of the resolver 15 relative to its stator member is in a fixed relation to the linear travel of the table 5. In the system illustrated, the ratio of the gearing 14 is such that the rotor member of the resolver 15 makes one complete revolution for each 0.1 inch of travel of the table 5. In addition, successive adjacent resolvers are mechanically connected by gearing generally of identical ratio, as for example, 10:1. Thus, the rotor member of the resolver 16 is connected to the rotor member of the resolver 15 by gearing 27 whereby the rotor member of the resolver 16 will make one complete revolution for each ten revolutions of the rotor member of the resolver 15. Similar gearing 28 and 29 connects the rotor members of the resolvers 16, 17 and 18, respectively. Thus, for each revolution of the rotor member of the resolver 18, the rotor members of the resolvers 17, 16 and 15 will make 10, 100 and 1000 revolutions, respectively. The resolvers 15, 16, 17 and 18 may, therefore, be characterized as extra high speed, high speed, medium speed and low speed resolvers, respectively, and will be referred to hereafter as the 1000-speed, 100-speed, 10-speed and 1-speed resolvers, respectively.

Since it is the purpose of the control system to accurately and precisely position the table 5, information concerning the desired, preselected position must be fed to the control system and this may be accomplished in a number of conventional manners such as by use of rotary switches, push button keyboards, or punched tape readers. Since the form of input data unit employed forms no part of this invention, the input information is illustrated schematically in FIG. 1 as being related from a command unit 30. The input information must be translated into voltage signals which can be imposed across each element of the primary windings 19, 20, 21 and 22 of the resolvers. The voltages imposed across the primary windings may be produced by input signal means in the form of a digital to analog converter 31, of conventional design and known operation, and which includes a series of transformers which may be tapped at various points at the direction of the command unit 30 to produce output voltages for representing shaft positions of the rotors, and wherein the analog information is in terms of the sine and cosine of the angular shaft positions of the resolvers 15, 16, 17 and 18 which will yield the desired position of the table 5. The voltages thus produced are placed across the elements of the primary windings so that when the desired position of the table 5 is reached, the error voltages induced in the secondary windings 23, 24, 25 and 26 will be zero, if the lack of precision of the digital to analog converter 31 discussed hereafter is disregarded.

A plurality of conventional command resolvers which are identical to the resolvers 15, 16, 17 and 18 may be employed as the input signal means in place of the digital to analog converter 31. When such command resolvers are employed, the command unit 30, in effect, positions the rotor windings of the command resolvers relative to the stator windings so that voltages are imposed in the primary windings 19, 20, 21 and 22 of the resolvers 15, 16, 17 and 18, respectively, which induces an error voltage in the secondary windings 23, 24, 25 and 26, respectively. Again, when the voltage induced in the secondary windings is zero, the resolvers are said to be in correspondence and the preselected position of the table 5 has been reached.

The pair of elements of each of the secondary windings 23, 24, 25 and 26 of the resolvers 15, 16, 17 and 18, respectively, are connected in series with one another and each pair of elements has terminals at either end. However, the secondary winding 23 of the 1000-speed resolver 15 is also tapped between its two elements 32 and 33, and the element 33 may be considered to be a final positioning winding separate and distinct from the element 32.

The alternating error voltage induced in each of the secondary windings 42, 25 and 26 and in each of the elements 32 and 33 of the winding 23 varies with the position of the rotor member relative to the stator member, and the values of the maximum voltages that may be induced will attain a peak value and decrease to zero value twice in each revolution of the rotor member. For one-half revolution, the error voltage will have an in-phase relation with the supply voltage impressed across the associated primary windings 19, 20, 21 and 22, and for the other half revolution the error voltage will be in phase reversal with respect to the supply voltage. The values of maximum induced error voltages present an envelope that varies sinusoidally with rotational position. When the error voltage is in-phase with the supply voltage a plot of such in-phase error voltages is represented by a positive half cycle of a sinusoidal curve of FIG. 2, and when the error voltage is in phase reversal with the supply voltage a plot of such error voltages is represented by a negative half cycle of a sinusoidal curve of FIG. 2.

In FIG. 2 the abscissa represents angular displacement in degrees of the rotor winding element 32 of the 1000-speed resolver 15 and the ordinate represents the error voltage induced in the secondary windings 24, 25 and 26 and in the element 32. A sinusoidal curve 34 for the element 32 of the 1000-speed resolver 15 completes one cycle for each 360° rotation of the rotor member of the 1000-speed resolver 15. Since the rotor member of the 100-speed resolver 16 makes one complete revolution for each ten revolutions of the rotor member of the 1000-speed resolver 15 due to the gear ratio of the gearing 27, a sinusoidal curve 35 for the 100-speed resolver 16 completes one cycle for each ten cycles of the curve 34. Similarly, each cycle of a sinusoidal curve 36 for the 10-speed resolver 17 encompasses ten cycles of the curve 35, and a sinusoidal curve 37 for the 1-speed resolver 18 completes one cycle for every ten cycles of the curve 36.

Complete cycles of the curves 36 and 37 are not shown because of the abscissa scale employed. In the system being described the resolvers 15, 16, 17 and 18 preferably have the same maximum output voltage rating and, since the curve 34 represents only the error voltage induced in the one element 32 of the 1000-speed resolver 15, the peak amplitude of the curve 34 is about .707 of the peak amplitude of the curves 35, 36 and 37 which represent error voltages induced in two elements spaced 90° apart.

From FIG. 2 it can be seen that if the positional disagreement is substantial, that is if the rotor member of the 1000-speed resolver 15 would require more than 180° of rotation before the table 5 would reach the desired position, the 1000-speed resolver 15 could not be employed to control the motor 6 since the envelope of the error voltage output of the element 32 of the 1000-speed resolver 15 would follow the curve 34 to a zero value at a point 360° away from the desired position of the rotor member of the resolver 15 and would result in a false position. The point 360° away from the desired position of the rotor member of the 1000-speed resolver 15 would be reached by the action of a discriminator 63. The discriminator 63, when supplied with an error voltage which falls in the negative half cycle of the curve 34 will cause the motor 6 to drive in one direction, and when supplied with an error voltage which falls in the positive half cycle of the curve 34 will cause the motor 6 to drive in an opposite direction. Therefore, each resolver has its individual zone of control which is about equal to one-half cycle of its respective sinusoidal curve and control of the motor 6 must be transferred from one resolver to the adjacent higher speed resolver within the zone of control of the higher speed resolver.

In the system being described, the rotor member of the 1000-speed resolver 15 makes one complete revolution for each 0.1 inch linear travel of the table 5 and the rotor member of the 1-speed resolver 18 will make one complete revolution for each 100 inches of linear travel of the table 5. Since the sinusoidal curve 37 exhibits two null points, or points of zero error voltage, for each complete revolution of the rotor member of the 1-speed resolver 18, to avoid ambiguity due to the phase reversal of the induced error voltage, only one desired position point may exist within the limit of movement of the table 5. Thus, the zone of control of the 1-speed resolver 18 is limited to one-half of its sinusoidal curve 37, which corresponds to a 50 inch linear movement of the table 5, and this is the limit of table movement which may be controlled. Similarly, the effective zones of control for the remaining resolvers 15, 16 and 17 are equal to the half cycle of their sinusoidal curves 34, 35 and 36, respectively, or 0.05 inch, 0.5 inch and 5 inches, respectively. Thus, the 1-speed resolver 18 is employed when the positional disagreement exceeds 5 inches and consecutively higher speed resolvers are employed as the positional disagreement decreases.

A voltage switching circuit is employed to perform the function of transferring control of the motor 6 from one to another of the resolvers within their respective zones of control. The voltage switching circuit may take the form of a static switch circuit which is fully disclosed and described in the copending application of Lynn H. Matthias and Odo J. Struger, for "Static Switch for Multi-Speed Error Detector Control System," Serial No. 165,636, filed January 11, 1962, and assigned to the assignee of this invention. A common lead 90 of the elements 32 and 33 and one lead 91, 92 and 93 of each of the secondary windings 24, 25 and 26, respectively, are connected together by one output lead 39 of the static switch circuit 38. The leads 90, 91, 92 and 93 are each connected to one side of voltage limiting non-linear conductors preferably in the form of double anode or symmetrical zener diodes 40, 41, 42 and 43, respectively. Zener diodes are a form of non-linear conductor which exhibit not only a voltage drop in their forward direction but also exhibit the characteristic of breakdown in their reverse direction when the voltage exceeds a certain level, the value of which is termed the breakdown voltage. A double anode or symmetrical zener diode may be considered to be two single anode zener diodes so connected that there is a symmetrical breakdown in both directions, which breakdown in both directions is necessary when an A.C. source is used for the control system.

A protecting resistor 44 is connected to a second lead 48 of the element 32 and connects to the other side of the double anode zener diode 40. The lead 48 is interrupted by a normally open contact 49 of a control relay 50. Protecting resistors 45, 46 and 47 are connected to the non-common connected leads 94, 95 and 96, respectively, of the secondary windings 24, 25 and 26, and each protecting resistor 45, 46 and 47 connects with the other side of a respective double anode zener diode 41, 42 and 43. An error voltage controlling circuit which includes a resistor and a non-linear conductor connected in series is, therefore, provided across the leads 48 and 90 of the element 32 and across the pairs of leads 91 and 94, 92 and 95, and 93 and 96 of each of the secondary windings 24, 25 and 26, respectively.

The static switch circuit 38 further includes a resistive summing circuit comprising a set of three resistors 56, 57 and 58 connected to one another in series. One end of the summing circuit terminates in a second output lead 55 of the static switch circuit 38, and the opposite end of the summing circuit is joined at a junction point 51 with the voltage controlling circuit comprising the resistor 44 and the double anode zener diode 40. The summing circuit is also connected to each of the remaining voltage controlling circuits at junction points 52, 53 and 54, and as seen in FIG. 1, each of these connections is made intermediate the resistor and double anode zener diode of the respective controlling circuit. Blocking non-linear conductors preferably in the form of double anode zener diodes 59, 60 and 61 are placed in the connections of the voltage controlling circuits of the resolvers 16, 17 and 18, respectively, with the summing circuit.

Each of the limiting double anode zener diodes 40, 41, 42 and 43 limit the error voltage output of the resolvers that is transmitted to the summing circuit to a level which cannot be exceeded. For example, the voltage across the junction point 51 and the output lead 39 will be clipped to a level equal to the sum of the breakdown voltage and forward voltage drop across the double anode zener diode 40. Therefore, regardless of the alternating error voltage induced in the element 32 the voltage produced by the element 32 across the output leads 39 and 55 of the static switch circuit 38 will not exceed the sum of the breakdown voltage and forward voltage drop of the double anode zener diode 40 less the voltage drops across each of the resistors 56, 57 and 58 of the summing circuit.

Each of the blocking double anode zener diodes 59, 60 and 61 has the effect of decreasing the amplitude of error voltage of its resolver 24, 25 and 26, respectively, by an amount about equal to its breakdown voltage. The net result is that each of the sinusoidal curves 35, 36 and 37 are adjusted by an amount equal to the breakdown voltage plus the forward voltage drop of the double anode zener diode 59, 60 and 61, respectively. In other words, each of the positive half cycles of the sinusoidal curves 35, 36 and 37 are adjusted downwardly by such amount and each of the negative half cycles are adjusted upwardly by such amount. The resulting adjusted sinusoidal curves will each have a null zone or region of zero error voltage which encompasses the point of correspondence. The purpose of providing such a null zone is to prevent a false point of correspondence which may result from the lack of precision of the digital to analog converter 31 and misalignment of the rotor members of the resolvers. Such lack of precision may result in the zero transition, equivalent to zero induced error voltage, being somewhat different for each resolver in that at a desired position point there may exist some output voltages of the lower speed resolvers. Therefore, the null zones are created to prevent transfer of the control of the driving means back to lower speed synchros when the induced error voltage in the element 32 is zero at the desired position point. It should be noted that a blocking double anode zener diode is not used for the element 32 of the 1000-speed resolver 15 since it is necessary that the curve 34 for the element 32 pass sharply through zero to obtain high resolution for positioning about the point of correspondence of the element 32.

Therefore, the error voltages fed to the output leads 39 and 55 by the resolvers 16, 17 and 18 are limited by the limiting double anode zener diodes 41, 42 and 43, respectively, and by the blocking double anode zener diodes 59, 60 and 61. For example, the error voltage imposed across the output leads 39 and 55 of the static switch circuit 38 by the 100-speed resolver 16 will be limited to a level equal to the breakdown voltages plus the forward voltage drop of the limiting double anode zener diode 41 less the breakdown voltage and forward voltage drop of the blocking double anode zener diode 59 and less the voltage drops across the resistors 57 and 58 of the summing circuit. Similarly, the error voltage imposed across the output leads 39 and 55 by the 10-speed resolver 17 will be limited to a level equal to the breakdown voltage plus the forward voltage drop of the limiting double anode zener diode 42 less the breakdown voltage and forward voltage drop of the blocking double anode zener diode 60 and less the voltage drop across the resistor 58 of the summing circuit. Finally, the error voltage imposed across the output leads 39 and 55 of the static switch circuit 38 by the 1-speed resolver 18 will be limited to a level equal to the breakdown voltage plus the forward voltage drop across the limiting double anode zener diode 43 less the breakdown voltage and the forward voltage drop across the blocking double anode zener diode 61.

To facilitate an understanding of the general operation of the static switch circuit 38, let it be assumed that it is desired to move the machine tool table 5 to a new position which is more than five inches away from a present position of the work table 5. Voltages will be imposed by the digital to analog converter 31 across the primary windings 19, 20, 21 and 22 of each of the resolvers 15, 16, 17 and 18, respectively, which are in terms of the sine and cosine of the angular shaft positions of the rotor members of the resolvers which will yield the desired position of the table 5. Alternating error voltages are thereby induced in the element 32 of the secondary winding 23 and in the secondary windings 24, 25 and 26. Under the assumed conditions, the positional difference is within the zone of control of the 1-speed resolver 18 only, and the 1-speed resolver 18 must control the output of the static switch circuit to 38 to avoid false positioning as hereinbefore described. Although the alternating error voltage induced in the secondary winding 26 of the 1-speed resolver 18 may be greater or less than the alternating error voltages simultaneously induced in the secondary windings 24 and 25 and in the element 32, the voltages applied across the output leads 39 and 55 by the 1000-speed resolver 15, the 100-speed resolver 16, and the 10-speed resolver 17 will be limited, as described above, and the level of such voltages will not exceed the voltage applied across the output leads 39 and 55 by the 1-speed resolver 18. The limiting double anode zener diodes 40, 41, 42 and 43 and the blocking double anode zener diodes 59, 60 and 61 are selected to exhibit breakdown voltages which cooperate with suitable resistance levels for the resistors 56, 57 and 58 of the summing circuit to insure that the maximum voltages fed to the output leads 39 and 55 by higher speed resolvers will not exceed the maximum voltages fed thereto by lower speed resolvers. Therefore, under the assumed conditions the voltage applied across the output leads 39 and 55 by the 1-speed resolver 18 will be at least as great as the voltages applied thereacross by the higher speed resolvers and the voltage induced in the secondary winding 26 of the 1-speed resolver 18 will control the output voltage of the static switch circuit. The output voltage of the static switch circuit 38 ultimately controls the driving of the motor 6 and, therefore, the table 5 is moved toward the desired position.

As the positional difference decreases due to the movement of the table 5 toward the desired position, the error voltage induced in the secondary winding 26 of the 1-speed resolver 18 will decrease to a level less than the breakdown voltage of the limiting double anode zener diode 43 and, consequently, the voltage applied across the output leads 39 and 55 by the 1-speed resolver 18 will decrease. Ultimately, the voltage applied across the output leads 39 and 55 by the 10-speed resolver 17 will be greater than the voltage applied thereacross by the 1-speed resolver 18. This will occur within the zone of control of the 10-speed resolver 17 and the 10-speed resolver 17 will then control the output voltage of the static switch circuit 38 and the driving of the motor 6. Similarly, as the table 5 continues to move toward the desired position the control of the output voltage of the static switch circuit 38 is transferred to the 100-speed resolver 16 when the voltage applied across the output leads 39 and 55 by the 10-speed resolver 17 becomes less than the voltage applied thereacross by the 100-speed resolver 16. Finally, control of the output voltage of the static switch circuit 38 is transferred to the 1000-speed resolver 15 when the voltage applied across the output leads 39 and 55 by the 100-speed resolver 16 becomes less than the voltage applied thereacross by the 1000-speed resolver 15. At the desired position, the error voltage induced in the element 32 is zero and the blocking double anode zener diodes 59, 60 and 61 insure that the error voltages fed to the output leads 39 and 55 by the resolvers 16, 17 and 18 is also zero.

In such manner control of the drive of the motor 6 is transferred from low speed resolvers to successively higher speed resolvers as the positional disagreement decreases, and such transfer of control is accomplished within the zone of control of each resolver.

The alternating error voltage which will be produced at the output leads 39 and 55 of the static switch circuit 38 is fed through an amplifier 62 to a phase discriminator 63 which determines the phase of the alternating error voltage with respect to the supply voltage and produces a direct voltage having a polarity which corresponds to the direction of error. Such direct voltages are fed to the motor control unit 12 to control the driving of the motor 6. The amplifier 62 and discriminator 63 may be of conventional design and operation and their construction forms no part of the present invention.

When the output voltage of the static switch circuit 38 is zero and the corresponding voltage supplied to the motor control unit 12 by the discriminator 63 is also zero, the lead screw 7 has been rotated in the proper amount and direction to cause the rotor members of the resolvers 15, 16, 17 and 18 to rotate to a point of correspondence. Theoretically, the table 5 should then have been positioned at the desired position. However, the presence of mechanical backlash in the cooperating lead screw 7 and nut 8 may result in a false position of the table 5. Backlash may be defined as the amount by which the tooth space exceeds the thickness of an engaging tooth. The presence of mechanical backlash gives rise to a zone of lost motion where the rotation of the lead screw 7 will produce no corresponding movement of the table 5. For example, the table 5 has previously been moved to the left relative to FIG. 1, the clearance will lie to the right of the teeth of the lead screw 7. If it is then desired to move the table 5 to the right relative to FIG. 1, it is necessary for the lead screw 7 to move in excess of the normal movement to overcome such lost motion. In the system being described the angular positions of the rotor members of the resolvers 15, 16, 17 and 18 are determined by the movement of the lead screw 7 and not by the position of the table 5, and thus there is no compensation for such lost motion.

The take-up system of this invention effectively eliminates false positioning resulting from the presence of mechanical backlash by initially moving the table 5 to a preliminary offset point which is always to the same side of the desired final position, and such preliminary offset point corresponds to that position at which the error voltage induced in the winding element 32 is zero. After being brought to the preliminary offset point the table 5 is moved to the desired final position by an error voltage which is induced in the second element or final positioning winding 33 of the resolver 15. In FIG. 3, the manner of achieving first a preliminary offset point and then a final position is illustrated by use of the sinusoidal error voltage curves. FIG. 3 is a portion of the sinusoidal curves 34 and 35 of FIG. 2 to an enlarged scale together with a sinusoidal curve 64 for the final positioning winding 33. Since the final positioning winding 33 is displaced 90° in space from the element 32 of the 1000-speed resolver 15, the sinusoidal curve 64 is likewise displaced 90° from the sinusoidal curve 34 for the element 32, as shown in FIG. 3. The rotor members of the resolvers 16, 17 and 18 and the rotor wound element 32 of the 1000-speed resolver 15 are properly geared to each other and to the lead screw 7 to produce zero error voltage at a point offset from the desired programmed position of the table 5. In the system being described, the rotor member of the 1000-speed resolver 15 makes one complete revolution for each 0.1 inch of linear movement of the table 5 and the offset point is spaced one-quarter cycle, or 0.025 inch away from the final programmed position. Thus, the table 5 is moved to an offset position represented by a point 65 in FIG. 3 under the control of the resolvers 16, 17 and 18 and the element 32 of the 1000-speed resolver 15. The point 65 is the equivalent shaft position of the rotors of the resolvers 16, 17 and 18 and of the element 32 of the resolver 15 which will yield the offset position of the table 5. Control of the motor 6 is then transferred to the final positioning winding 33 by switching means hereinafter described. It will be noted from FIG. 3 that the final positioning winding 33 exhibits an error voltage when the error voltages of the resolvers 16, 17 and 18 and the element 32 are zero, and such error voltage output of the final positioning winding 33 is fed through a second amplifier 67 to the discriminator 63. Thus, the table 5 is moved to the final desired position represented by a point 66 in FIG. 3 and the approach is always from the same side since the offset position 65 is always to the same side of the final position 66. The point 66 is the equivalent shaft position of the final positioning winding 33 which will yield the final desired position of the table 5.

A D.C. source is imposed across a pair of input conductors 68 and 69, with one conductor 69 being grounded. The input conductor 68 is connected to one side of a master switch 70 and the opposite side of the switch 70 connects with a conductor 71. One side of the coil of the control relay 50 is connected to the conductor 71, and the other side is joined to a conductor 72 that extends to an output lead 73 of the amplifier 62. The output lead 73 in turn connects with the grounded input conductor 69. The master switch 70 is closed only momentarily, either manually or automatically by the command unit 30, at the start of the positioning operation. Closing of the switch 70 energizes the coil of the relay 50 which has the effect of closing a normally open contact 74 of the relay 50 which is placed in the connection of the second output lead 55 of the static switch circuit 38 to the amplifier 62, and also has the effect of closing the normally open contact 49 of the relay 50. Thus, error voltages induced in the secondary windings 24, 25 and 26 and in the element 32 will be fed to the static switch circuit 38 and thence to the first amplifier 62. The discriminator 63 is connected to a second output lead 75 of the amplifier 62 by a conductor 76 and is further connected to the grounded input conductor 69 by a conductor 77.

One end of the final positioning winding 33 is connected to the common connected lead 90 of the secondary winding 23 and the other end of the winding 33 is connected to a lead 78 which in turn is connected to the second amplifier 67. The second amplifier 67 is also connected to the output lead 39 of the static switch circuit 38 by a conductor 79. The lead 78 is interrupted by a normally closed contact 80 of the relay 50. Therefore, when the coil of the relay 50 is energized by the closing of the master switch 70, the contact 80 is opened and the direct voltage output of the discriminator 63 is governed solely by the voltage output of the static switch circuit 38.

A self-sustaining circuit is provided for the coil of the relay 50 and includes a transformer 82 whose primary winding 81 is connected across the output leads 73 and 75 of the amplifier 62, and whose secondary winding 83 is connected across the input corners of a full wave bridge rectifier 84. One of the pair of output corners of the bridge rectifier 84 is connected to the conductor 72 and the other corner is connected to a conductor 85 which connects to one side of a normally open contact 86 of the relay 50. The other side of the contact 86 is connected to the conductor 71. Thus, when the coil of the relay 50 is energized, the contact 86 is also closed and a closed circuit which includes the coil of the relay 50 is completed through the conductors 71 and 72, the bridge rectifier 84 and the conductor 85. When the static switch circuit 38 is permitted to feed output voltages to the first amplifier 62 by the closing of the contacts 74 and 49, voltages will appear across the output leads 73 and 75 of the amplifier 62. Furthermore, a voltage will be induced in the secondary winding 83 of the transformer 82 which will result in a D.C. voltage appearing across the output corners of the bridge rectifier 84. Since the switch 70 opens immediately after energizing the relay 50, the relay 50 is held energized thereafter by the direct current in the self-sustaining closed circuit above described. Thus, the master switch 70 is not required after its initial closing and must reopen shortly after its initial closing.

The second amplifier 67 is provided with a pair of output leads 87 and 88. The discriminator 63 is connected to one of the output leads 87 by a conductor 89 and is also connected to the other output lead 88, which connects with the grounded input conductor 69, by the conductor 77 to receive output voltages of the second amplifier 67.

When the voltage output of the static switch circuit 38 is zero, indicating that the offset point has been reached, the relay 50 will be deenergized since there is no longer an input voltage to the bridge rectifier 84. This permits the contacts 49 and 74 to return to their normally open condition which has the effect of removing the static switch circuit 38 from control of the discriminator 63. At the same time, control of the discriminator 63 is transferred to the final positioning winding 33 by the return of the contact 80 to its normally closed position.

When control of the driving circuit means, which includes the discriminator 63 and motor control unit 12, is transferred to the final positioning winding 33, an error voltage will be fed to the discriminator 63 through the amplifier 67 since the error voltage induced in the final positioning winding 33 is a maximum at the offset position. The error voltage fed to the discriminator 63 by the final positioning winding 33 will fall in the negative half cycle of the sinusoidal curve 64 and the discriminator 63 will produce a direct current voltage having the proper polarity to cause the motor 6 to drive the table 5 to the final desired position 66. The polarity of the direct current voltage produced by the discriminator 63 will always be the same for error voltages fed thereto by the final positioning winding 33 and, therefore, the table 5 will always be moved in the same direction from the offset point to the final desired position. When the final programmed position has been reached, the error voltage induced in the final desired winding 33 will be zero and the voltage fed to the discriminator 63 will be zero. Although the element 32 and resolvers 16, 17 and 18 will exhibit an error voltage when the table 5 is at the final desired position, such error voltage cannot be fed to the discriminator 63 since the contacts 74 and 49 are in their normally open condition. Once the final desired position has been reached, the switching means is ready for the next positioning demand.

With the take-up system of this invention, regardless of the direction of approach of the table 5, the table 5 will always be positioned at an offset point which is to one side of the final desired position. Thereafter, the table will always be driven in the same direction from the offset position to the final programmed position by the action of the discriminator 63.

It is not necessary that the highest speed synchro take the form of a resolver 15. It is necessary, however, that the final positioning winding be displaced in space from the other element or elements of the secondary or output winding of the highest speed error detector. Furthermore, such angular displacement need not be 90° but rather may vary by as much as 30° while retaining a sufficient margin of safety. As shown in FIG. 3, a maximum margin for error exists when the angular displacement is 90° since the voltage output of the final positioning winding 33 is then a maximum when the error voltage in the element 32 is zero. Theoretically, control may be transferred to the final positioning winding 33 at any point within one-half cycle of its error voltage curve 64 once the voltage output of the element 32 has reached zero. However, to guard against inaccuracies in the system, the control should be transferred between 60° and 120° and thus the angular displacement between the final positioning winding 33 and the other elements of the secondary or output winding of the highest speed error detector should be within such range.

The system of this invention effectively overcomes the problem of mechanical blacklash which may be present in the lead screw and other gearing. In addition, it eliminates other inaccuracies which may be present in the system and the system is particularly effective when it is desired to move the table 5 only a very slight distance which may be less than the offset distance. With the system of this invention, the table 5 is always moved a distance at least equal to the amount of offset, and this results in greater accuracy.

We claim:

1. In a control system for positioning an object, said system including an induction device movable in response to motion of the object and having input windings and an output winding relatively movable with respect to the input windings and that is inductively coupled to the input windings, input signal means for said input windings which place voltages on such windings indicative of a selected position for said object, and driving circuit means for said object connected to said output winding and to which signal voltages of said output winding are fed, the combination therewith of a take-up system comprising: a final positioning winding for said induction device relatively movable with respect to the input windings that is inductively coupled to the input windings and angularly displaced with respect to said output winding, said final positioning winding being connected to said driving circuit means to transmit signal voltages of said final positioning winding to said driving circuit means; and switching means adapted to break the connection between said output winding and said driving circuit means and to complete the connection between said final positioning winding and said driving circuit means when the voltage signal of said output winding is zero.

2. In a control system for positioning an object, said system including an induction device movable in response to motion of the object and having input windings and an output winding relatively movable with respect to the input windings and that is inductively coupled to the input windings, input signal means for said input windings which place voltages on such windings indicative of a selected position for said object, driving circuit means for said object connected to said output winding and to which signal voltages of said output winding are fed, and output circuit connections for said output winding for conducting signal voltages of said output winding to the driving circuit means, the combination therewith of a backlash take-up system comprising: a final positioning winding for said induction device relatively movable with respect to the input windings that is inductively coupled to the input windings and angularly displaced about 90 degrees with respect to said output winding; final positioning circuit connections for said final positioning winding for conducting signal voltages of said final positioning winding to the driving circuit means; switch means including a coil; normally open switching contacts in said output circuit connections and responsive to said coil; normally closed switching contacts in said final positioning circuit connections and responsive to said coil; and means adapted to energize said coil until the signal voltages of said output winding is zero.

3. In a control system for positioning an object, said system including a succession of induction devices movable in response to motion of the object and each having input windings and an output winding relatively movable with respect to the input windings and that is inductively coupled to the input windings, input signal means for said input windings which place voltages on such windings indicative of a selected position for said object, a first of said induction devices having a relatively high rate of change of signal voltages of its output winding relative to movement of said object and the others of said induction devices having successively lesser rates of change of signal voltages of their output windings, a signal voltage switching circuit for said output windings and adapted to produce output voltages which are controlled by the signal voltages of the output windings, and driving circuit means for said object connected to said voltage switching circuit and to which signal voltages of said voltage switching circuit are fed, the combination therewith of a backlash take-up system comprising: a final positioning winding for said first induction device relatively movable with respect to the input windings that is inductively coupled to the input windings and displaced about 90 degrees with respect to said output winding, said final positioning winding being connected to said driving circuit means to transmit signal voltages of said final positioning winding to said driving circuit means; and switching means adapted to break the connection between the output winding of said first induction device and said voltage switching circuit and to break the connection between said voltage switching circuit and said driving circuit means, and adapted to complete the connection between said final positioning winding and said driving circuit means when the output voltage of said voltage switching circuit is zero.

4. In a position control system for an object, said system including reversible driving means, mechanical driven means connecting said driving means and said object, feedback means responsive to movement of the driven means and adapted to control the driving means to position the object at a point offset from a final desired position of the object and including a succession of induction devices coupled to said driven means and each having relatively movable primary and secondary windings, input signal means which impose voltages on each of said primary windings to induce error voltages in said secondary windings when there is a disagreement between the actual position of the object and the offset position, a first of said induction devices having a relatively high rate of change of error voltages relative to movement of said driven means and the others of said induction devices having successively lesser rates of change of error voltages, and an error voltage switching circuit connected to said secondary windings and adapted to produce output voltages which are controlled by said error voltages, and amplifier and discriminator means connected to said voltage switching circuit and responsive to the output voltages of said voltage switching circuit for supplying to said driving means direct voltages of proper polarity to actuate said driving means, the combination therewith of a backlash take-up system adapted to control said driving means to move said object from said offset position to the final desired position and comprising: a final positioning winding for said first induction device angularly displaced from the secondary winding of the first induction device and relatively movable with respect to said primary winding, said final positioning winding being connected to said amplifier and discriminator means; and switching means adapted to break the connection between said voltage switching circuit and said amplifier and discriminator means and to complete the connection between said final positioning winding and said amplifier and discriminator means when the output voltage of said voltage switching circuit is zero.

5. In a position control system for an object, said system including reversible electrical driving means, mechanical lead screw means coupled to said driving means and operative to move said object, feedback means responsive to movement of said lead screw means and adapted to control said driving means to position said object at a point offset from a final desired position of said object and including a succession of induction devices coupled to said lead screw means and each having relatively movable primary and secondary windings, input signal means which impose voltages on each of said primary windings to induce error voltages in said secondary windings when there is a disagreement between the actual position of the object and the offset position, a first of said induction devices having a relatively high rate of change of error voltages relative to movement of said lead screw means and the others of said induction devices having successively lesser rates of change of error voltages, an error voltage switching circuit connected to said secondary windings and adapted to produce output voltages which are controlled by said error voltages, first amplifier means connected to said voltage switching circuit, and discriminator means connected to said first amplifier means and responsive to the voltage output of said first amplifier means for supplying to said driving means a direct voltage of proper polarity to actuate said driving means, the combination therewith of a backlash take-up system adapted to control said driving means to move said object from said offset position to the final desired position and comprising: a final positioning winding for said first induction device spaced about 90 degrees apart from the secondary winding of the first induction device, and relatively movable with respect to said primary windings; second amplifier means connected to said final positioning winding and connected to said discriminator means; and switching means adapted to break the connections between said voltage switching circuit and the secondary winding of said first induction device and between said voltage switching circuit and said first amplifier means, and adapted to complete the connection between said final positioning winding and said second amplifier means when the voltage output of said first amplifier means is zero.

6. A system in accordance with claim 5 wherein the switching means comprises: a switch including a coil; normally open switching contacts responsive to said coil and in a connection of said voltage switching circuit with the secondary winding of said first induction device; normally open switching contacts responsive to said coil and in a connection of said voltage switching circuit with said first amplifier means; normally closed switching contacts responsive to said coil and in a connection of said final positioning winding with said second amplifier means; means for momentarily energizing said coil; and self-sustaining circuit means for said coil responsive to said voltage output of the first amplifier means for energizing said coil until said voltage output is zero.

No references cited.